(12) United States Patent
Konishi et al.

(10) Patent No.: US 11,353,068 B2
(45) Date of Patent: Jun. 7, 2022

(54) POWER TRANSMISSION DEVICE

(71) Applicant: DENSO CORPORATION, Kariya (JP)

(72) Inventors: Toshihiro Konishi, Kariya (JP);
Shigeyoshi Sakuraba, Kariya (JP);
Takayuki Hirose, Kariya (JP);
Toshihiro Hayashi, Kariya (JP)

(73) Assignee: DENSO CORPORATION, Kariya (JP)

(*) Notice: Subject to any disclaimer, the term of this patent is extended or adjusted under 35 U.S.C. 154(b) by 259 days.

(21) Appl. No.: 16/545,528

(22) Filed: Aug. 20, 2019

(65) Prior Publication Data
US 2019/0368555 A1 Dec. 5, 2019

Related U.S. Application Data

(63) Continuation of application No. PCT/JP2018/020233, filed on May 25, 2018.

(30) Foreign Application Priority Data

Jun. 23, 2017 (JP) .............................. JP2017-123193

(51) Int. Cl.
*F16D 27/112* (2006.01)
*F16D 9/02* (2006.01)
*F16D 27/14* (2006.01)

(52) U.S. Cl.
CPC .............. *F16D 27/112* (2013.01); *F16D 9/02* (2013.01); *F16D 27/14* (2013.01)

(58) Field of Classification Search
CPC .. F16D 27/112; F16D 27/14; F16D 2027/007; F16D 9/02

(Continued)

(56) References Cited

U.S. PATENT DOCUMENTS

| | | | | | |
|---|---|---|---|---|---|
| 4,793,455 | A | * | 12/1988 | Tabuchi | .................... F16D 3/68 |
| | | | | | 192/200 |
| 4,799,578 | A | * | 1/1989 | Matsushita | ........... F16D 27/112 |
| | | | | | 192/84.961 |

(Continued)

FOREIGN PATENT DOCUMENTS

| JP | H10-047383 A | 2/1998 |
|---|---|---|
| JP | 2000-145810 A | 5/2000 |

(Continued)

OTHER PUBLICATIONS

U.S. Appl. No. 16/581,880, filed Sep. 25, 2019, Konishi et al.

*Primary Examiner* — Richard M Lorence
(74) *Attorney, Agent, or Firm* — Posz Law Group, PLC

(57) ABSTRACT

A power transmission device includes an electromagnet, a rotor, an armature and a hub. The hub couples the armature to a shaft of a drive-subject device. The hub includes: an outer hub that is coupled to the armature; a boss portion that is coupled to the shaft; an inner side plate-shaped portion that extends from the boss portion toward a radially outer side; and an inner plate that is placed between the outer hub and the inner side plate-shaped portion. The inner side plate-shaped portion and the inner plate are formed integrally in one piece. At least one of the inner side plate-shaped portion and the inner plate is formed by a member that is configured to deform or melt with heat generated by friction between the rotor and the armature when the shaft of the drive-subject device is locked at a time of energizing the electromagnet.

10 Claims, 10 Drawing Sheets

(58) Field of Classification Search
USPC .............................. 192/84.961, 82 T, 84.941
See application file for complete search history.

(56) References Cited

U.S. PATENT DOCUMENTS

| | | | |
|---|---|---|---|
| 5,036,964 A | | 8/1991 | Booth et al. |
| 5,150,779 A | | 9/1992 | Booth |
| 5,601,176 A | * | 2/1997 | Ishimaru ............... F16D 27/112 |
| | | | 192/200 |
| 5,687,823 A | | 11/1997 | Nakagawa et al. |
| 2005/0269183 A1 | * | 12/2005 | Ohtsuka ................ F16D 27/112 |
| | | | 192/84.961 |
| 2006/0151277 A1 | | 7/2006 | Yanagi |
| 2012/0237361 A1 | | 9/2012 | Cochran |

FOREIGN PATENT DOCUMENTS

| | | |
|---|---|---|
| JP | 2013-079662 A | 5/2013 |
| JP | 3194414 U | 11/2014 |
| KR | 10-1240433 B1 | 3/2013 |

* cited by examiner

POWER TRANSMISSION DEVICE

CROSS REFERENCE TO RELATED APPLICATIONS

This application is a continuation application of International Patent Application No. PCT/JP2018/020233 filed on May 25, 2018, which designated the U.S. and claims the benefit of priority from Japanese Patent Application No. 2017-123193 filed on Jun. 23, 2017. The entire disclosures of all of the above applications are incorporated herein by reference.

TECHNICAL FIELD

The present disclosure relates to a power transmission device.

BACKGROUND

There is a power transmission device configured to transmit a rotational drive force, which is outputted from a drive source, to a drive-subject device. For instance, an electromagnetic clutch, which serves as the power transmission device, includes a rotor, a hub and an armature. The rotor is rotated when the rotor receives a rotational force, which is outputted from a rotational drive source, through a belt. The hub is coupled to a rotatable shaft of a compressor. The armature is attracted to and is coupled to a friction surface of the rotor by a magnetic attractive force generated from an electromagnetic coil to transmit the rotation to the hub.

SUMMARY

This section provides a general summary of the disclosure, and is not a comprehensive disclosure of its full scope or all of its features.

According to the present disclosure, there is provided a power transmission device configured to transmit a rotational drive force, which is outputted from a drive source, to a drive-subject device. The power transmission device includes an electromagnet, a rotor, an armature and a hub. The electromagnet is configured to generate a magnetic attractive force when the electromagnet is energized. The rotor is configured to rotate about a predetermined rotational axis when the rotor receives the rotational drive force, which is outputted from the drive source, through a belt. The armature is configured to be coupled to and is rotated together with the rotor when the electromagnet is energized. The armature is configured to be decoupled from the rotor when the electromagnet is deenergized. The hub couples the armature to a shaft of the drive-subject device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
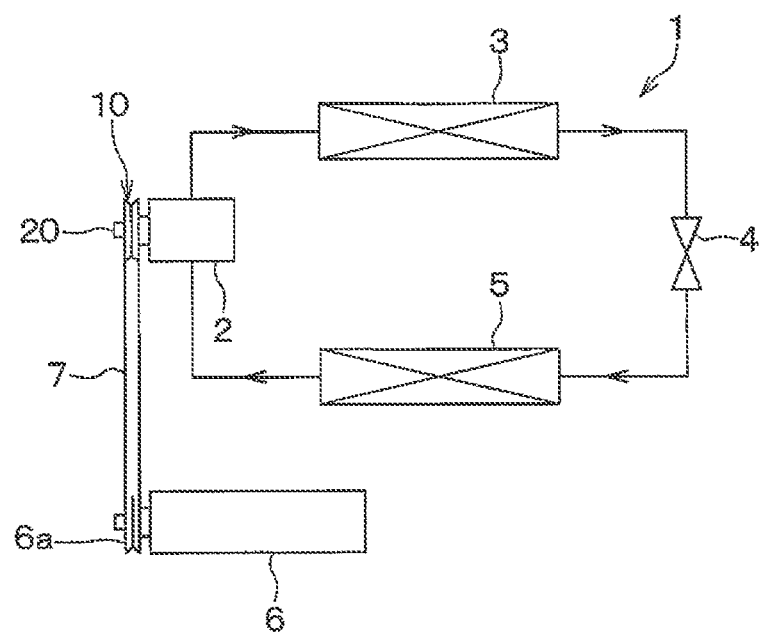
FIG. 1 is an overall layout diagram of a refrigeration cycle, to which a power transmission device of a first embodiment is applied.

As a power transmission device, there has been proposed an electromagnetic clutch. The electromagnetic clutch includes: a rotor that is rotated when the rotor receives a rotational force, which is outputted from a rotational drive source, through a belt; a hub that is coupled to a rotatable shaft of a compressor; and an armature that is attracted to and is coupled to a friction surface of the rotor by a magnetic attractive force generated from an electromagnetic coil to transmit the rotation to the hub.

The electromagnetic clutch further includes a thermal fuse that is placed at an inside of a coil housing, which receives and securely holds the electromagnetic coil. The thermal fuse is placed at a location that is adjacent to both of the friction surface of the rotor and a radially inner side cylindrical tubular portion of the coil housing.

In this electromagnetic clutch, when the compressor malfunctions and locks up, frictional heat of a slipping contact portion between the armature and the rotor is conducted to the thermal fuse through an end part of the radially inner side cylindrical tubular portion of the coil housing. Therefore, the thermal fuse melts and opens, and thereby conduction of the electric power to the electromagnetic coil is blocked. Then, the armature is displaced away from the friction surface of the rotor, so that breakage of the belt is limited.

However, according to a study of the inventors of the present application, since the electromagnetic clutch described above is configured to have the thermal fuse and a fuse holding member for holding the thermal fuse, the number of the components is disadvantageously increased, and thereby the costs are disadvantageously increased. Furthermore, according to the study of the inventors of the present application, the electromagnetic clutch requires a connecting step for connecting between the thermal fuse and the electromagnetic coil.

According to one aspect of the present disclosure, there is provided a power transmission device configured to transmit a rotational drive force, which is outputted from a drive source, to a drive-subject device, including:

an electromagnet that is configured to generate a magnetic attractive force when the electromagnet is energized;

a rotor that is configured to rotate about a predetermined rotational axis when the rotor receives the rotational drive force, which is outputted from the drive source, through a belt;

an armature that is configured to be coupled to and is rotated together with the rotor when the electromagnet is energized, wherein the armature is configured to be decoupled from the rotor when the electromagnet is deenergized; and a hub that couples the armature to a shaft of the drive-subject device, wherein:

the hub includes:

an outer hub that is coupled to the armature;

a boss portion that is coupled to the shaft;

an inner side plate-shaped portion that extends from the boss portion toward a radially outer side in a radial direction of the shaft; and an inner plate that is placed between the outer hub and the inner side plate-shaped portion;

the inner side plate-shaped portion and the inner plate are formed integrally in one piece; and at least one of the inner side plate-shaped portion and the inner plate is formed by a member that is configured to deform or melt with heat generated by friction between the rotor and the armature when the shaft of the drive-subject device is locked at a time of energizing the electromagnet.

Therefore, at least one of the inner side plate-shaped portion and the inner plate deforms or melts with the heat generated by the friction between the rotor and the armature when the shaft of the drive-subject device is locked at the time of energizing the electromagnet. Even in the locked state of the shaft, the armature can be rotated together with the rotor, and thereby the breakage of the belt can be limited at the time of locking the compressor without using the thermal fuse.

According to another aspect of the present disclosure, there is also provided a power transmission device configured to transmit a rotational drive force, which is outputted from a drive source, to a drive-subject device, including:

an electromagnet that is configured to generate a magnetic attractive force when the electromagnet is energized;

a rotor that is configured to rotate when the rotor receives the rotational drive force, which is outputted from the drive source, through a belt;

an armature that is configured to be coupled to and is rotated together with the rotor when the electromagnet is energized, wherein the armature is configured to be decoupled from the rotor when the electromagnet is deenergized; and a hub that couples the armature to a shaft of the drive-subject device, wherein:

the hub includes:

an outer hub that is coupled to the armature;

an inner hub that is coupled to the shaft; and an inner plate that is placed between the outer hub and the inner hub; and the outer hub is formed by a member that is configured to deform or melt with heat generated by friction between the rotor and the armature when the shaft of the drive-subject device is locked at a time of energizing the electromagnet.

Therefore, the outer hub deforms or melts with the heat generated by the friction between the rotor and the armature when the shaft of the drive-subject device is locked at the time of energizing the electromagnet. Even in the locked state of the shaft, the armature can be rotated together with the rotor, and thereby the breakage of the belt can be limited at the time of locking the compressor without using the thermal fuse.

According to another aspect of the present disclosure, there is also provided a power transmission device configured to transmit a rotational drive force, which is outputted from a drive source, to a drive-subject device, including:

an electromagnet that is configured to generate a magnetic attractive force when the electromagnet is energized;

a rotor that is configured to rotate when the rotor receives the rotational drive force, which is outputted from the drive source, through a belt;

an armature that is configured to be coupled to and is rotated together with the rotor when the electromagnet is energized, wherein the armature is configured to be decoupled from the rotor when the electromagnet is deenergized; and a hub that couples the armature to a shaft of the drive-subject device, wherein:

the hub includes:

an outer hub that is coupled to the armature;

a fastening member that fastens the outer hub to the armature;

an inner hub that is coupled to the shaft; and an inner plate that is placed between the outer hub and the inner hub; and the fastening member is formed by a member that is configured to deform or melt with heat generated by friction between the rotor and the armature when the shaft of the drive-subject device is locked at a time of energizing the electromagnet.

Therefore, the fastening member deforms or melts with the heat generated by the friction between the rotor and the armature when the shaft of the drive-subject device is locked at the time of energizing the electromagnet. Even in the locked state of the shaft, the armature can be rotated together with the rotor, and thereby the breakage of the belt can be limited at the time of locking the compressor without using the thermal fuse.

Hereinafter, embodiments of the present disclosure will be described. In the following embodiments, parts, which are the same as or equivalent to the parts described in the preceding embodiments, may be given the same reference signs, and descriptions thereof may be omitted. In addition, when only some of the components are described in the embodiment, the components described in the preceding embodiment can be applied to the other components. The following embodiments may be partially combined with each other even if they are not particularly specified as long as there is no problem in particular in the combination.

First Embodiment

A first embodiment will be described with reference to FIGS. 1 to 8. In the present embodiment, there will be described an example where a power transmission device 10 is applied to a compressor 2 of a vapor compression refrigeration cycle 1 shown in FIG. 1.

In a vehicle air conditioning apparatus for conditioning the air in a vehicle cabin, the refrigeration cycle 1 functions as an apparatus for adjusting the temperature of the air blown into the vehicle cabin. The refrigeration cycle 1 includes: a compressor 2 that compresses and discharges refrigerant; a radiator 3 that radiates heat from the refrigerant discharged from the compressor 2; an expansion valve 4 that depressurizes the refrigerant outputted from the radiator 3; and an evaporator 5 that evaporates the refrigerant depressurized through the expansion valve 4. The compressor 2, the radiator 3, the expansion valve 4 and the evaporator 5 are connected one after the other like a loop to form a closed circuit.

A rotational drive force, which is outputted from an engine 6, is transmitted to the compressor 2 through the power transmission device 10. In the present embodiment, the engine 6 serves as a drive source, which outputs the rotational drive force, and the compressor 2 serves as a drive-subject device.

For instance, a swash plate type variable displacement compressor may be used as the compressor 2. Another type of variable displacement compressor or a fixed displacement compressor (e.g., a scroll type fixed displacement compressor or a vane type fixed displacement compressor) may be used as the compressor 2 as long as such a compressor can compress and discharge the refrigerant of the refrigeration cycle 1 upon transmission of the rotational drive force to the compressor 2.

In the compressor 2 of the present embodiment, one end side of the shaft 20 is exposed to an outside of a housing (not shown). The power transmission device 10 is installed to an exposed portion of the shaft 20, which is exposed to the outside of the housing. A seal member (e.g., a lip seal) is installed to the shaft 20 to limit leakage of the refrigerant from an inside of the housing to the outside through a gap between the shaft 20 and the housing while the housing forms an outer shell of the compressor 2. A material, a shape and the like of the seal member are optimized to implement high sealing performance between the shaft 20 and the housing.

Next, the power transmission device 10 is a device that enables and disables transmission of the rotational drive force of the engine 6, which serves as a drive source for driving the vehicle, to the compressor 2, which is the drive-subject device. The power transmission device 10 is connected to a rotation output portion 6a of the engine 6 through a belt 7.

Figure 2:
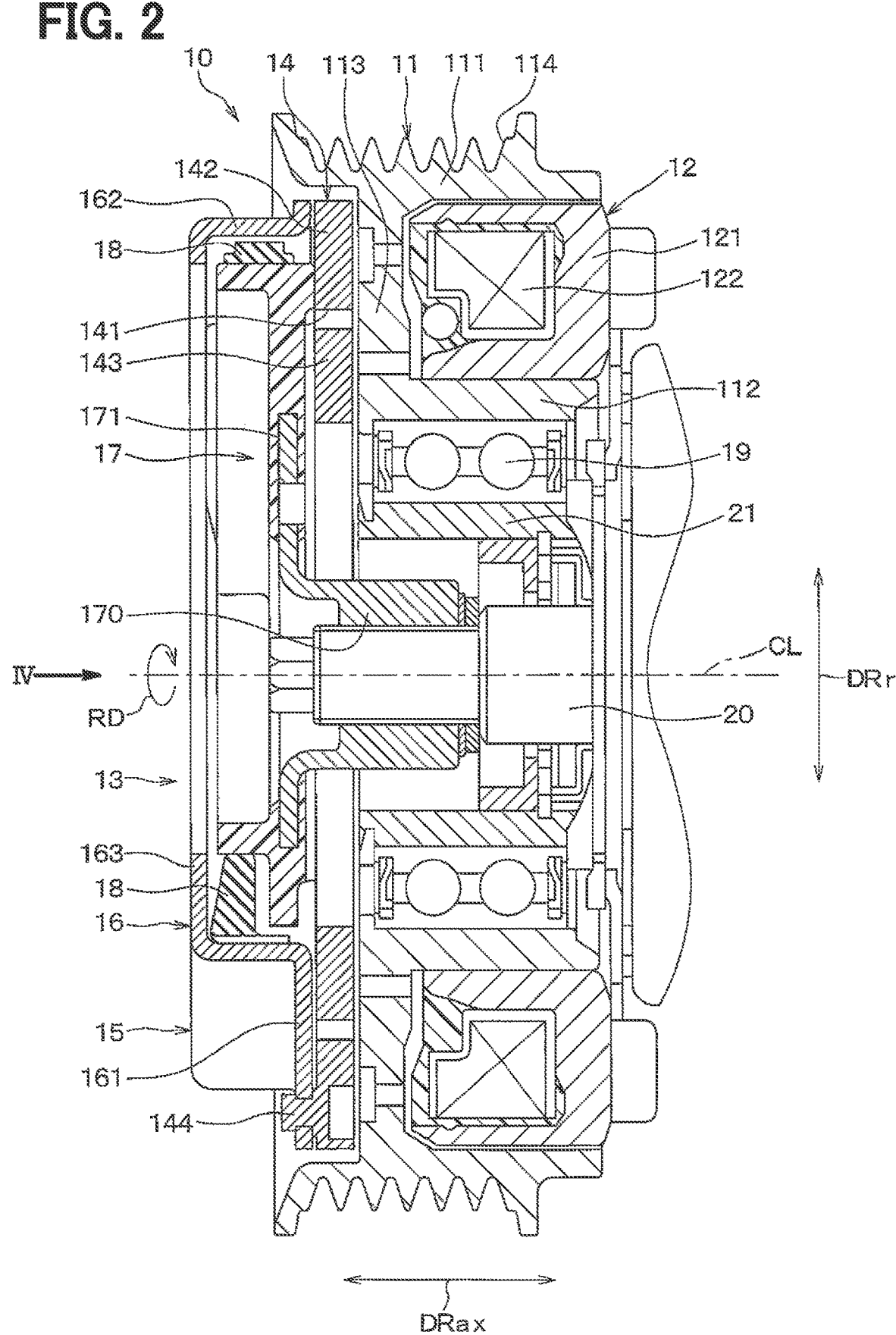
FIG. 2 is a schematic cross-sectional view showing an overall structure of the power transmission device of the first embodiment.

FIG. 2 is a cross-sectional view of the power transmission device 10, which is taken along an axial direction of the shaft 20 of the compressor 2. A reference sign DRax shown in FIG. 2 indicates the axial direction of the shaft 20 that extends along a central axis CL of the shaft 20. Furthermore, a reference sign DRr shown in FIG. 2 indicates a radial direction of the shaft 20 that is perpendicular to the axial direction DRax. These descriptions about the reference signs DRax, DRr are also equally applicable to the other drawings, which are other than FIG. 2.

Figure 3:
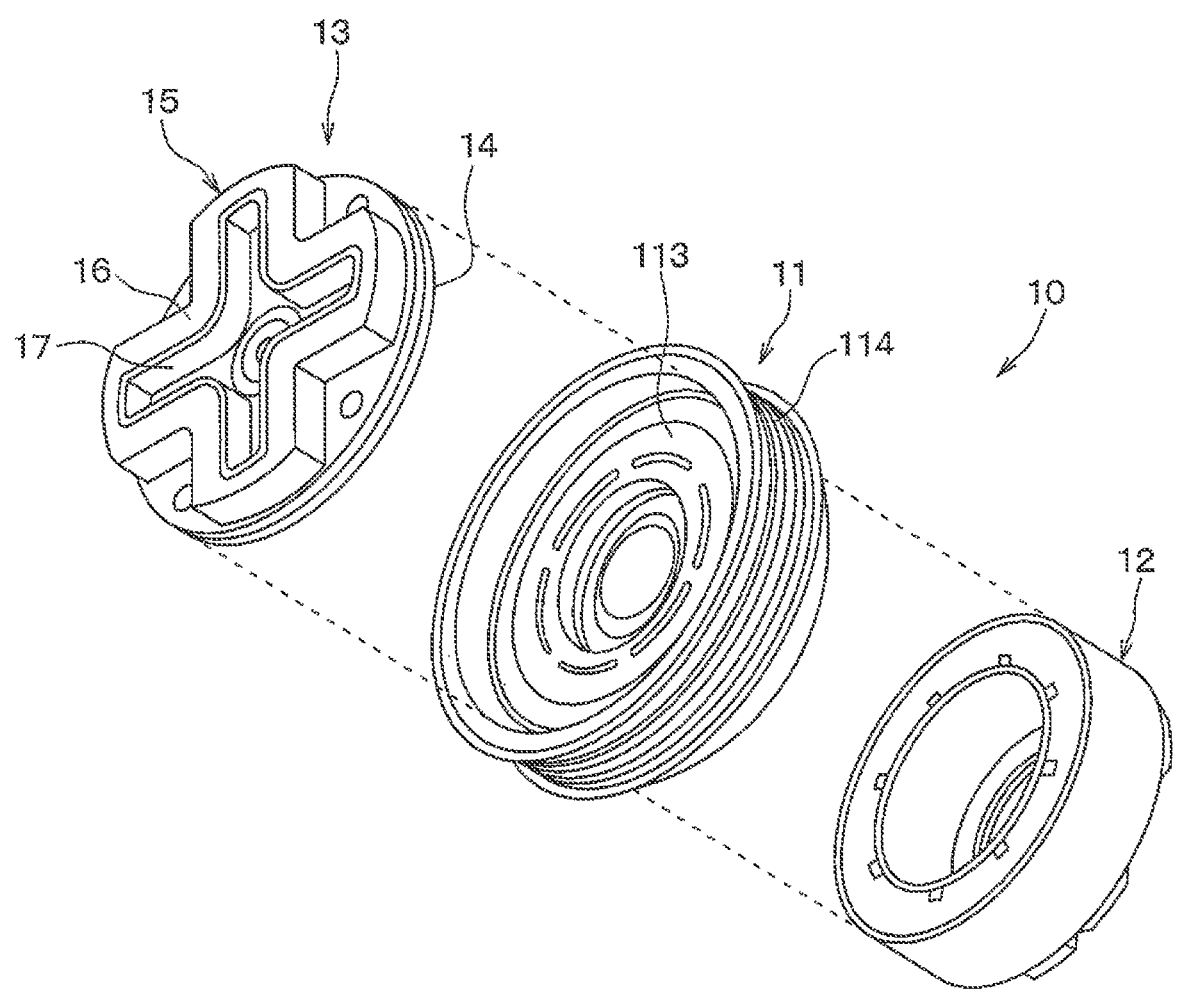
FIG. 3 is a schematic perspective exploded view of the power transmission device of the first embodiment.

As shown in FIGS. 2 and 3, the power transmission device 10 includes: a rotor 11; a driven-side rotatable body 13 that is configured to be rotated integrally with the shaft 20 of the compressor 2 when the driven-side rotatable body 13 is coupled to the rotor 11; and an electromagnet 12 that is configured to generate a magnetic attractive force for coupling between the driven-side rotatable body 13 and the rotor 11.

The rotor 11 serves as a driving-side rotatable body that is rotated by the rotational drive force outputted from the engine 6. As shown in FIG. 2, the rotor 11 of the present embodiment includes an outer cylindrical tubular portion 111, an inner cylindrical tubular portion 112 and an end surface portion 113.

The outer cylindrical tubular portion 111 is shaped in a cylindrical tubular form and is coaxial with the shaft 20. The inner cylindrical tubular portion 112 is shaped into a cylindrical tubular form and is placed on a radially inner side of the outer cylindrical tubular portion 111 while the inner cylindrical tubular portion 112 is coaxial with the shaft 20.

The end surface portion 113 is a connecting portion that connects between one end of the outer cylindrical tubular portion 111 and one end of the inner cylindrical tubular portion 112, which are located on one end side in the axial direction DRax. The end surface portion 113 is shaped in a circular disk form. Specifically, the end surface portion 113 extends in the radial direction DRr of the shaft 20 and has a through hole that has a circular cross section and extends through a center of the end surface portion 113.

A longitudinal cross section of the rotor 11 of the present embodiment taken along the axial direction DRax of the shaft 20 is shaped in a C-shape form. An annular space is formed between the outer cylindrical tubular portion 111 and the inner cylindrical tubular portion 112 while the end surface portion 113 forms a bottom surface portion of the annular space.

The space, which is formed between the outer cylindrical tubular portion 111 and the inner cylindrical tubular portion 112, is coaxial with the shaft 20. The electromagnet 12 is placed in this space that is formed between the outer cylindrical tubular portion 111 and the inner cylindrical tubular portion 112.

The electromagnet 12 includes a stator 121 and a coil 122 while the coil 122 is placed at an inside of the stator 121. The stator 121 is shaped into a ring form and is made of a ferromagnetic material (e.g., iron). The coil 122 is fixed to the stator 121 in a state where the coil 122 is resin molded with a dielectric resin material, such as epoxy resin. The electromagnet 12 is energized by a control voltage that is outputted from a control device (not shown).

The outer cylindrical tubular portion 111, the inner cylindrical tubular portion 112 and the end surface portion 113 are formed integrally in one piece from a ferromagnetic material (e.g., iron). The outer cylindrical tubular portion 111, the inner cylindrical tubular portion 112 and the end surface portion 113 form a portion of a magnetic circuit that is formed through the energization of the electromagnet 12.

An outer peripheral part of the outer cylindrical tubular portion 111 includes a V-groove portion 114 that is made of resin and has a plurality of V-grooves. The belt 7 is wound around the V-groove portion 114 to transmit the rotational drive force outputted from the engine 6.

An outer peripheral part of a ball bearing 19 is fixed to an inner peripheral part of the inner cylindrical tubular portion 112. A boss portion 21, which is shaped in a cylindrical tubular form and projects from the housing (serving as an outer shell of the compressor 2) toward the power transmission device 10, is fixed to an inner peripheral part of the ball bearing 19. In this way, the rotor 11 is rotatably fixed to the housing of the compressor 2. The boss portion 21 covers a base portion of the shaft 20, which is exposed to the outside of the housing.

An outside surface of the end surface portion 113, which is placed on the one end side in the axial direction DRax, forms a friction surface that contacts an armature 14 of the driven-side rotatable body 13, which will be described later, when the rotor 11 is coupled to the armature 14.

In the present embodiment, although not shown, a friction member, which is configured to increase a friction coefficient of the end surface portion 113, is formed at a portion of a surface of the end surface portion 113. This friction member is made of a non-magnetic material. The friction member may be made of a material formed by mixing alumina into resin and solidifying the same or may be made of a sinter of metal powder such as aluminum powder.

The driven-side rotatable body 13 includes the armature 14 and a hub 15. The armature 14 is a plate member shaped into a circular ring form. The armature 14 extends in the radial direction DRr and has a through hole that penetrates through the armature 14 at a center of the armature 14. The armature 14 is made of a ferromagnetic material (e.g., iron). The armature 14 cooperates with the rotor 11 to form a portion of the magnetic circuit that is formed when the electromagnet 12 is energized.

The armature 14 is opposed to the end surface portion 113 while a predetermined minute gap (e.g., about 0.5 mm) is interposed between the armature 14 and the end surface portion 113 of the rotor 11. A planar portion of the armature 14, which is opposed to the end surface portion 113 of the rotor 11, forms a friction surface that is configured to contact the end surface portion 113 when the rotor 11 and the armature 14 are coupled with each other.

Furthermore, the armature 14 of the present embodiment includes a plurality of grooves 141 that are formed to shield magnetism at an intermediate portion of the armature 14, which is placed in the middle of the armature 14 in the radial direction DRr. Each of the grooves 141 is shaped in an arcuate form that extends in the circumferential direction of the armature 14, and the plurality of grooves 141 is formed at the armature 14. The armature 14 of the present embodiment is divided into an outer peripheral portion 142, which is located on the radially outer side of the grooves 141, and an inner peripheral portion 143, which is located on the radially inner side of the grooves 141. The outer peripheral portion 142 of the armature 14 is joined to the hub 15 by fastening members 144, such as rivets. The fastening members 144 are respectively formed by a metal member made of, for example, aluminum.

The hub 15 forms a fastening member that fastens the armature 14 to the shaft 20 of the compressor 2. In other words, the armature 14 and the shaft 20 are coupled with each other through the hub 15.

Figure 4:
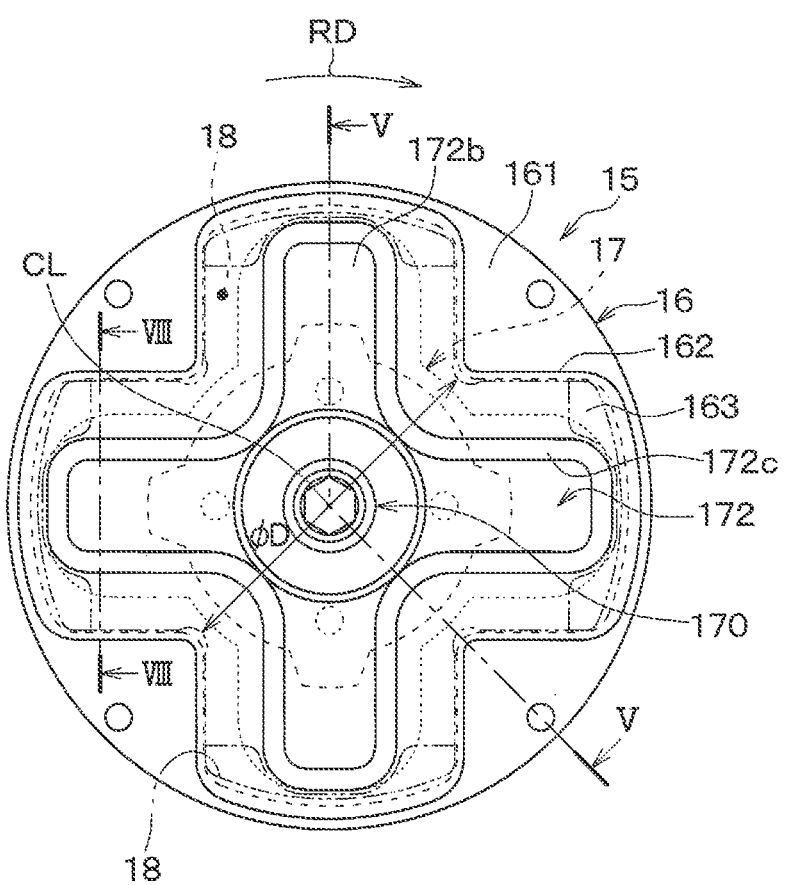
FIG. 4 is a diagram taken in a direction of an arrow IV in FIG. 2, showing a hub of the power transmission device.
Figure 5:
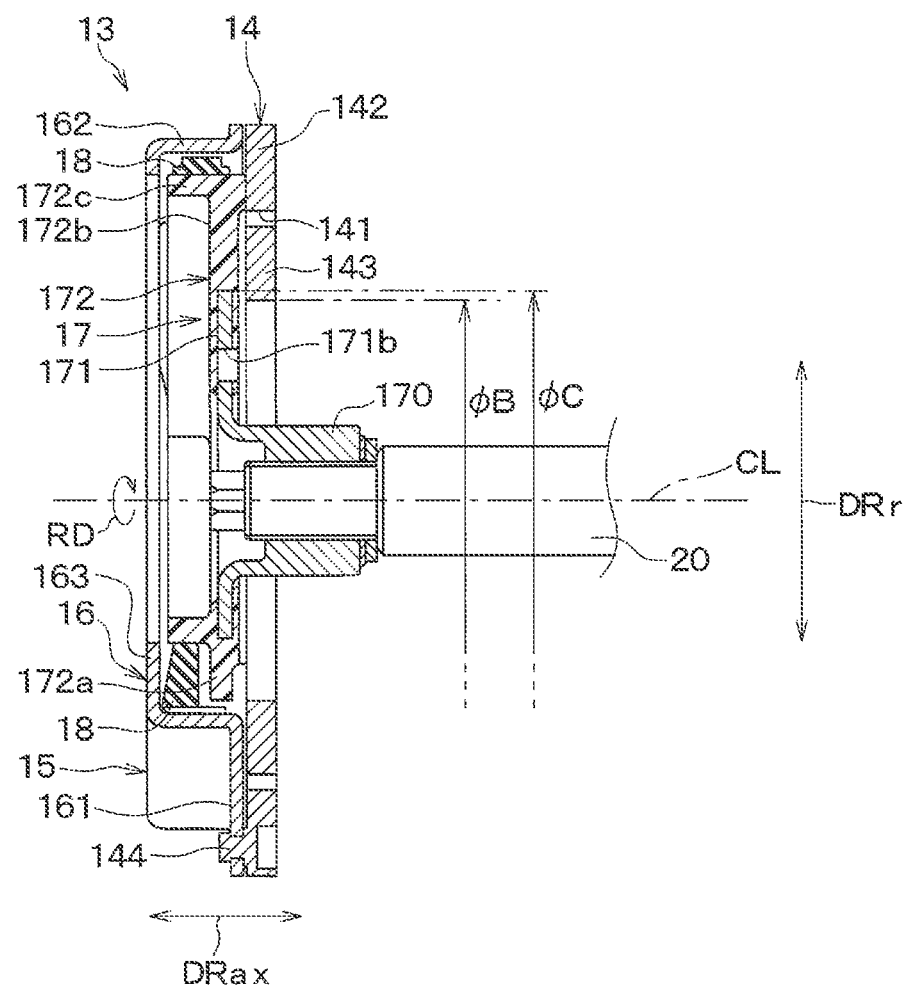
FIG. 5 is a cross-sectional view taken along line V-V in FIG. 4.

As shown in FIGS. 4 and 5, the hub 15 of the present embodiment includes an outer hub 16, an inner hub 17 and a rubber member 18. A dot-dot-dash line shown in FIG. 4 indicates an outer peripheral edge of the rubber member 18.

Figure 7:
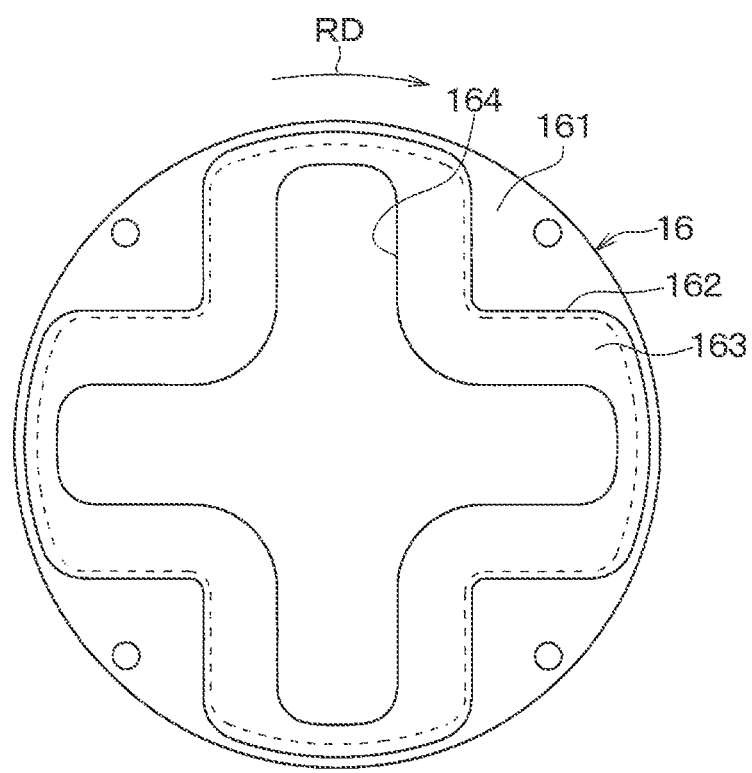
FIG. 7 is a schematic front view of an outer hub.

The outer hub 16 is coupled to the outer peripheral portion 142 of the armature 14 by the fastening members 144. As shown in FIGS. 5 and 7, the outer hub 16 includes: an outer side connecting portion 161 that is shaped in a plate form and is coupled to the armature 14; an outer side flange portion 162 that extends from an inner peripheral part of the outer side connecting portion 161 in the axial direction DRax of the shaft 20; and an outer side receiving portion 163. The outer hub 16 of the present embodiment is constructed such that the outer side connecting portion 161, the outer side flange portion 162 and the outer side receiving portion 163 are formed together in one piece. The outer hub 16 of the present embodiment is formed by a metal member that is made of, for example, aluminum.

The outer side connecting portion 161 is formed such that a shape of a radially outer part of the outer side connecting portion 161 corresponds to an outer shape of the armature 14. The outer side connecting portion 161 has an opening while the opening is shaped in a crisscross shape (i.e., a shape in a symbol of +) and is located at an inside of a part of the outer side connecting portion 161, which is coupled to the armature 14.

The outer side flange portion 162 extends from the inner peripheral part of the outer side connecting portion 161 in a direction away from the armature 14. The outer side flange portion 162 is shaped such that the outer side flange portion 162 surrounds the inner hub 17, which will be described later, in a rotational direction RD of the shaft 20.

Specifically, the outer side flange portion 162 is formed by a tubular portion that is shaped in a crisscross shape (i.e., a shape in a symbol of +), which corresponds to an outer shape of the inner hub 17. A predetermined gap is formed between the inner peripheral part of the outer side flange portion 162 and the outer peripheral part of the inner hub 17. In the present embodiment, the outer side flange portion 162 forms an inner peripheral wall part that surrounds a flange portion 172c of the inner hub 17, which will be described later, in the rotational direction RD of the shaft 20.

The outer side receiving portion 163 extends from the outer side flange portion 162 toward the axis CL of the shaft 20 such that the outer side receiving portion 163 is opposed to opposite parts of a plurality of projecting portions 172b of the inner hub 17, which are opposite to the armature 14, in the axial direction DRax of the shaft 20. An opening 164, which is shaped in a crisscross shape (i.e., a shape in a symbol of +), is formed at the center of the outer side receiving portion 163.

Figure 6:
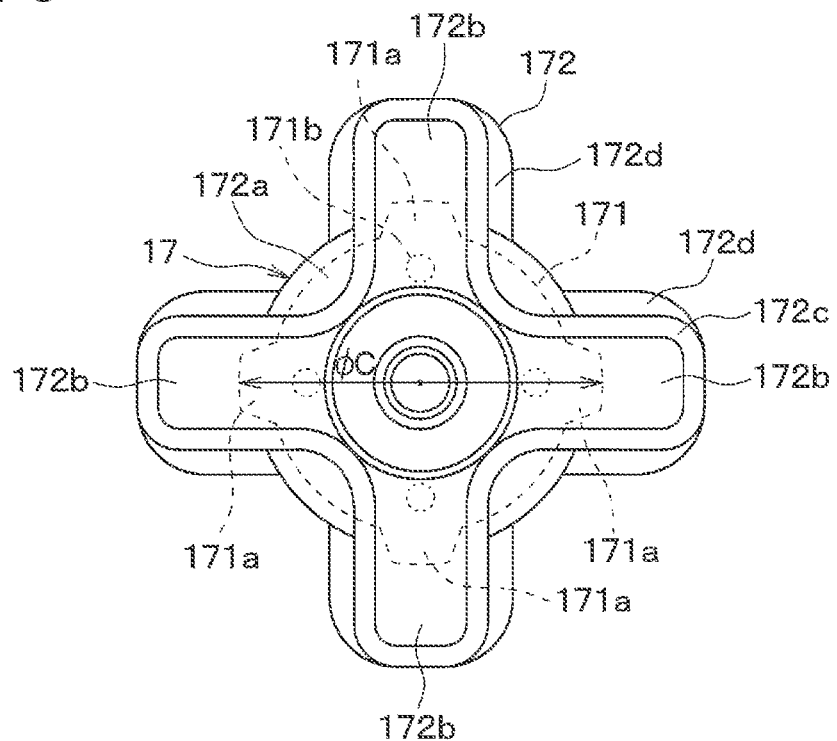
FIG. 6 is a front view of an inner hub.

Next, as shown in FIG. 5, the inner hub 17 is coupled to the shaft 20 of the compressor 2. As shown in FIGS. 5 and 6, the inner hub 17 includes a boss portion 170, an inner side plate-shaped portion 171 and an inner plate 172 while the boss portion 170 is coupled to the shaft 20. The boss portion 170 and the inner side plate-shaped portion 171 are formed integrally in one piece as a metal member that is made of, for example, iron. A part of the inner side plate-shaped portion 171 is embedded in the inner plate 172 by insert molding, so that the inner side plate-shaped portion 171 and the inner plate 172 are integrated together.

The boss portion 170 is formed by a tubular portion. A female thread, which is configured to be engaged with a male thread formed at an outer peripheral part of the shaft 20, is formed at an inner peripheral part of the boss portion 170. The inner hub 17 is coupled to the shaft 20 through the engagement between the female thread, which is formed at the boss portion 170, and the male thread of the shaft 20.

The inner side plate-shaped portion 171 is a member that extends from a surface of the boss portion 170, which is opposite from the compressor 2, in the radial direction DRr of the shaft 20. The inner side plate-shaped portion 171 includes four projections 171a, which outwardly project in the radial direction DRr of the shaft 20. Furthermore, four molding holes 171b are formed at the inner side plate-shaped portion 171.

The inner plate 172 is placed between the outer hub 16 and the inner side plate-shaped portion 171. The inner plate 172 couples between the outer hub 16 and the inner side plate-shaped portion 171. The inner plate 172 includes a main body portion 172a, the projecting portions 172b, the flange portion 172c and receiving portions 172d. The main body portion 172a, the projecting portions 172b, the flange portion 172c and the receiving portions 172d are molded in one piece from resin. The inner plate 172 of the present embodiment is made of the resin having a melting point of about 180 to 300 degrees Celsius. Specifically, the inner plate 172 may be made of PBT (polybutylene terephthalate), PO (polyolefin), nylon 66, PPS (polyphenylene sulfide) or the like.

The main body portion 172a is shaped in a circular disk form and extends in the radial direction DRr of the shaft 20. The four projecting portions 172b are formed at the outer peripheral part of the main body portion 172a and outwardly project in the radial direction DRr of the shaft 20.

The flange portion 172c projects from outer peripheral parts of the projecting portions 172b in a direction away from the armature 14. The flange portion 172c projects in the axial direction DRax of the shaft 20 such that the flange portion 172c is opposed to the outer side flange portion 162.

Specifically, the flange portion 172c is formed by a tubular portion that is shaped in a crisscross shape (i.e., a shape in a symbol of +). A predetermined gap is formed between the outer peripheral part of the flange portion 172c and the inner peripheral part of the outer hub 16.

The receiving portions 172d are formed to limit movement of the rubber member 18 in the axial direction DRax of the shaft 20. The receiving portions 172d outwardly extend in the radial direction DRr of the shaft 20 from outer peripheral parts of the projecting portions 172b.

The rubber member 18 holds the outer hub 16 with an elastic force thereof such that the outer hub 16 is movable relative to the inner hub 17 in the axial direction DRax of the shaft 20, and the rubber member 18 cushions and transmits the rotational force of the outer hub 16 to the inner hub 17.

Figure 8:
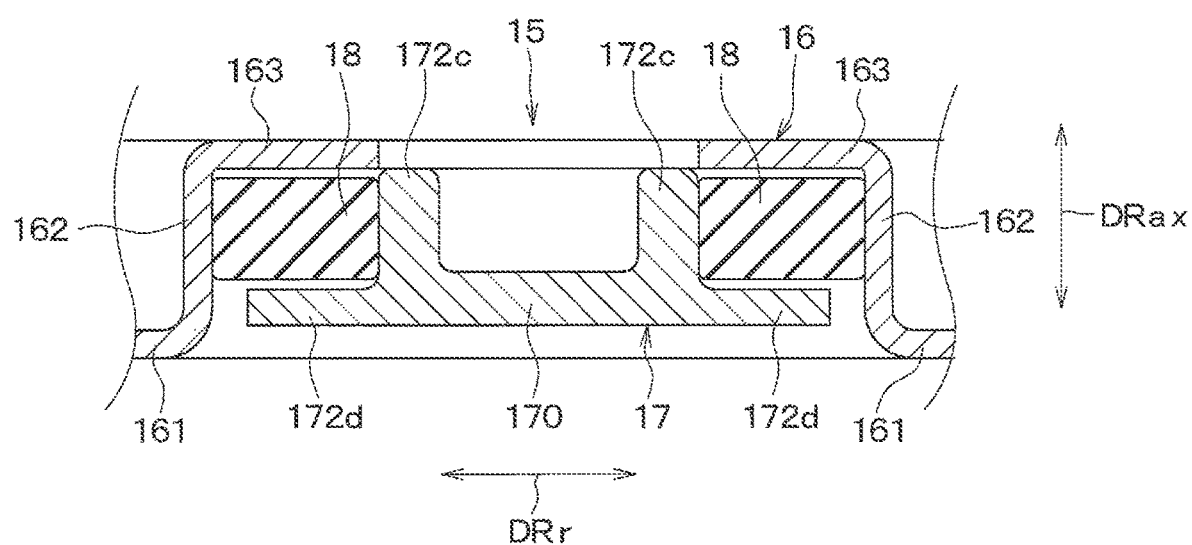
FIG. 8 is a cross-sectional view taken along line VIII-VIII in FIG. 4.

As shown in FIGS. 5 and 8, the rubber member 18 is placed between the outer side flange portion 162 of the outer hub 16 and the flange portion 172c of the inner plate 172. The rubber member 18 of the present embodiment has a shape that corresponds to a shape of the gap formed between the inner peripheral part of the outer side flange portion 162 and the outer peripheral part of the flange portion 172c of the inner plate 172.

When the armature 14 is magnetically attracted to and is coupled to the rotor 11, the inner plate 172 transmits the torque, which is transmitted from the rotor 11 through the outer peripheral portion 142 of the armature 14, the fastening members 144, the outer hub 16 and the rubber member 18, to the inner hub 17.

In the energized state of the electromagnet 12, a predetermined gap is formed between the inner plate 172 and the outer peripheral portion 142 of the armature 14. Then, when the electromagnet 12 is deenergized, the inner plate 172 contacts the outer peripheral portion 142 of the armature 14 and receives the outer peripheral portion 142 of the armature 14.

Furthermore, as shown in FIG. 5, the inner side plate-shaped portion 171 of the present embodiment is placed such that a center of the inner side plate-shaped portion 171 coincides with the rotational axis CL of the rotor 11. The armature 14 includes the outer peripheral portion 142 and the inner peripheral portion 143, which are concentrically arranged about the rotational axis CL of the rotor 11. A circular opening is formed at a center of the inner peripheral portion 143, and the inner peripheral portion 143 is placed between the rotor 11 and the inner side plate-shaped portion 171. A largest diameter of the inner side plate-shaped portion 171, which is largest in the circumferential direction of the inner side plate-shaped portion 171, i.e., a largest outer diameter $\Phi C$ of the inner side plate-shaped portion 171, which is largest in the circumferential direction of the inner side plate-shaped portion 171, is larger than an inner diameter $\Phi B$ of the inner peripheral portion 143. The outer peripheral portion 142 and the inner peripheral portion 143 respectively serve as an annular portion.

The outer hub 16 is fixed to the outer peripheral portion 142 such that the outer hub 16 covers the outer peripheral part of the inner side plate-shaped portion 171. Furthermore, as shown in FIGS. 4 and 5, a smallest diameter of the inner peripheral surface of the outer hub 16, which is smallest in the circumferential direction of the inner peripheral surface of the outer hub 16, i.e., a smallest inner diameter $\Phi D$ of the inner peripheral surface of the outer hub 16, which is smallest in the circumferential direction of the inner peripheral surface of the outer hub 16, is larger than the largest outer diameter $\Phi C$ of the inner side plate-shaped portion 171, which is largest in the circumferential direction of the inner side plate-shaped portion 171.

Next, the operation of the power transmission device 10 of the present embodiment will be described. In the case where the electromagnet 12 is in the deenergized state, the magnetic attractive force of the electromagnet 12 is not generated. Therefore, the armature 14 is urged by the rubber member 18 in the direction away from the end surface portion 113 of the rotor 11.

In this way, the rotational drive force of the engine 6 is transmitted to the rotor 11 through the belt 7 but is not transmitted to the armature 14 and the hub 15, so that only the rotor 11 runs idle around the ball bearing 19. Therefore, the compressor 2, which is the drive-subject device, is held in the stop state.

In contrast, in the case where the electromagnet 12 is in the energized state, the magnetic attractive force of the electromagnet 12 is generated. The armature 14 is attracted to the end surface portion 113 of the rotor 11 by the magnetic attractive force, and thereby the armature 14 is coupled to the rotor 11 by the magnetic attractive force. In this way, the rotation of the rotor 11 is transmitted to the shaft 20 of the compressor 2 through the driven-side rotatable body 13, so that the compressor 2 is driven. Specifically, the rotational drive force, which is outputted from the engine 6, is transmitted to the compressor 2 through the power transmission device 10, and thereby the compressor 2 is driven. At this time, although the temperature of the friction surface of the armature 14 and the temperature of the friction surface of the end surface portion 113 of the rotor 11 are increased to, for example, about 100 degrees Celsius, the inner plate 172 is not deformed.

Here, if the compressor 2 malfunctions and thereby locks up to stop the rotation of the shaft 20 of the compressor 2, slipping occurs between the friction surface of the armature 14 and the friction surface of the end surface portion 113 of the rotor 11, which are respectively made of the ferromagnetic material, such as iron. Thereafter, the temperature of the friction surface of the armature 14 and the temperature of the friction surface of the end surface portion 113 of the rotor 11 are increased by the frictional heat, and thereby the armature 14 progressively glows red hot.

Then, the radiant heat of the armature 14, which glows red hot, is transmitted to the inner plate 172, and thereby the temperature of the inner plate 172 is progressively increased. At this time, the temperature of the inner plate 172 is increased to, for example, about 300 degrees Celsius.

When the temperature of the inner plate 172 approaches its melting point, the resin of the inner plate 172 is softened to reduce the strength of the inner plate 172. When the temperature of the inner plate 172 is increased beyond its melting point, the inner plate 172 melts.

Here, it should be noted that the inner plate 172 is formed by a member that is configured to deform or melt with the radiant heat generated by the friction between the rotor 11 and the armature 14 when the shaft 20 of the compressor 2 is locked.

Figure 9:
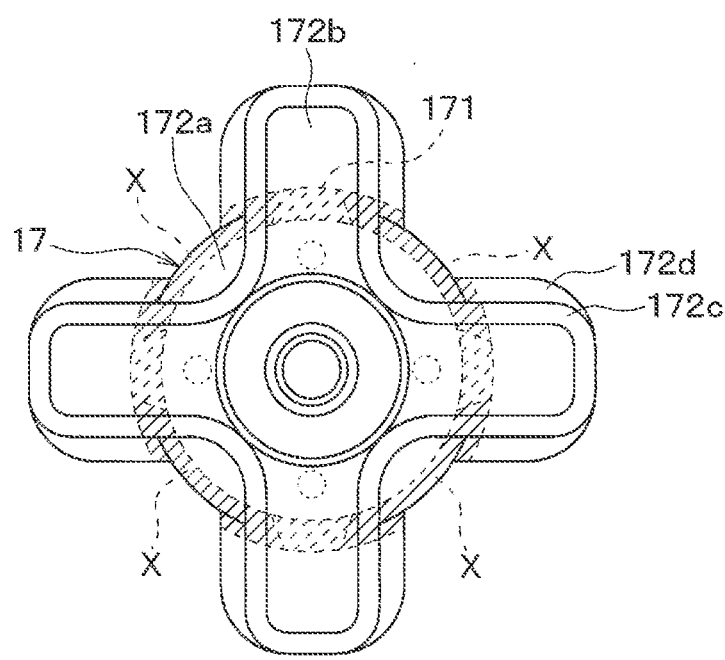
FIG. 9 is a diagram showing an area X of the inner plate.

Thus, the radiant heat, which is generated by the friction between the rotor 11 and the armature 14, results in the increase in the temperature of the inner plate 172, and thereby a boundary between the inner plate 172 and the inner side plate-shaped portion 171 of the inner hub 17, particularly, a region X in FIG. 9 deforms or melts. Thereby, a bonding force between the inner side plate-shaped portion 171 of the inner hub 17 and the inner plate 172 is rapidly reduced.

Therefore, the outer peripheral portion of the inner plate 172, i.e., the projecting portions 172b, the flange portion 172c and the receiving portions 172d of the inner plate 172 begin to rotate together with the rotor 11, the armature 14, the outer hub 16 and the rubber member 18 while the inner side plate-shaped portion 171 of the inner hub 17 is held stationary by the shaft 20 of the compressor 2.

Specifically, the transmission of the torque between the rotor 11 and the armature 14 is blocked, so that the breakage of the belt 7, which transmits the rotational drive force from the engine 6 to the rotor 11, can be limited.

As described above, the power transmission device of the present embodiment includes: the electromagnet 12 that is configured to generate the magnetic attractive force when the electromagnet 12 is energized; and the rotor 11 that is configured to rotate about the predetermined rotational axis CL when the rotor 11 receives the rotational drive force, which is outputted from the drive source 6, through the belt 7. The power transmission device of the present embodiment further includes: the armature 14 that is configured to be coupled to and is rotated together with the rotor 11 when the electromagnet 12 is energized, wherein the armature 14 is configured to be decoupled from the rotor 11 when the electromagnet 12 is deenergized; and the hub 15 that couples the armature 14 to the shaft 20 of the drive-subject device.

The hub 15 includes: the outer hub 16 that is coupled to the armature 14; the boss portion 170 that is coupled to the shaft 20; the inner side plate-shaped portion 171 that extends from the boss portion 170 toward the radially outer side in the radial direction of the shaft 20; and the inner plate 172 that is placed between the outer hub 16 and the inner side plate-shaped portion 171. The inner side plate-shaped portion 171 and the inner plate 172 are formed integrally in one piece. The inner plate 172 is formed by the member that is configured to deform or melt with the heat generated by the friction between the rotor 11 and the armature 14 when the shaft 20 of the drive-subject device is locked at the time of energizing the electromagnet 12.

Therefore, the inner side plate-shaped portion 171 deforms or melts with the heat generated by the friction between the rotor 11 and the armature 14 when the shaft 20 of the drive-subject device is locked at the time of energizing the electromagnet 12. Even in the locked state of the shaft 20, the armature 14 can be rotated together with the rotor 11, and thereby the breakage of the belt can be limited at the time of locking the compressor without using the thermal fuse.

Furthermore, the inner side plate-shaped portion 171 of the present embodiment is placed such that the center of the inner side plate-shaped portion 171 coincides with the rotational axis CL of the rotor 11. Furthermore, the armature 14 includes the outer peripheral portion 142 and the inner peripheral portion 143, which are concentrically arranged about the rotational axis CL of the rotor 11. Also, the circular opening is formed at the center of the inner peripheral portion 143, and the inner peripheral portion 143 is placed between the rotor 11 and the inner side plate-shaped portion 171. The largest outer diameter ΦC of the inner side plate-shaped portion 171, which is largest in the circumferential direction of the inner side plate-shaped portion 171 about the rotational axis CL of the rotor 11, is larger than the inner diameter ΦB of the inner peripheral portion 143.

Therefore, when the inner plate 172 deforms or melts, the armature 14 can be engaged with the inner side plate-shaped portion 171 to limit releasing and flying of the armature 14. Furthermore, it is possible to limit the armature 14 from flying and damaging the components of the vehicle.

Furthermore, the largest outer diameter ΦC of the inner side plate-shaped portion 171, which is largest in the circumferential direction of the inner side plate-shaped portion 171, is larger than the inner diameter ΦB of the inner peripheral portion 143. Thus, the inner plate 172, which is formed integrally with the inner side plate-shaped portion 171, is placed closer to the armature 14 (serving as the heat source) in comparison to a case where the largest outer diameter ΦC of the inner side plate-shaped portion 171, which is largest in the circumferential direction of the inner side plate-shaped portion 171 about the rotational axis CL of the rotor 11, is smaller than the inner diameter ΦB of the inner peripheral portion 143. Thereby, the inner plate 172 can effectively receive the radiant heat from the armature 14.

Furthermore, the inner side plate-shaped portion 171 includes the projections 171a, which outwardly project in the radial direction of the shaft 20.

Since the inner side plate-shaped portion 171 includes the projections 171a, which outwardly project in the radial direction of the shaft 20, the bonding force between the inner side plate-shaped portion 171 and the inner plate 172 can be increased.

The outer hub 16 is fixed to the outer peripheral portion 142 such that the outer hub 16 covers the outer peripheral part of the inner side plate-shaped portion 171. Furthermore, the smallest inner diameter ΦD of the inner peripheral surface of the outer hub 16, which is smallest in the circumferential direction of the inner peripheral surface of the outer hub 16, is larger than the largest outer diameter ΦC of the inner side plate-shaped portion 171, which is largest in the circumferential direction of the inner side plate-shaped portion 171.

Therefore, when the outer hub 16 begins to rotate together with the armature 14 upon the deforming or the melting of the inner plate 172, occurrence of contact of the outer hub 16 to the inner side plate-shaped portion 171 can be limited. Thus, the inner side plate-shaped portion 171 does not interfere with the rotation of the outer hub 16.

Second Embodiment

Figure 10:
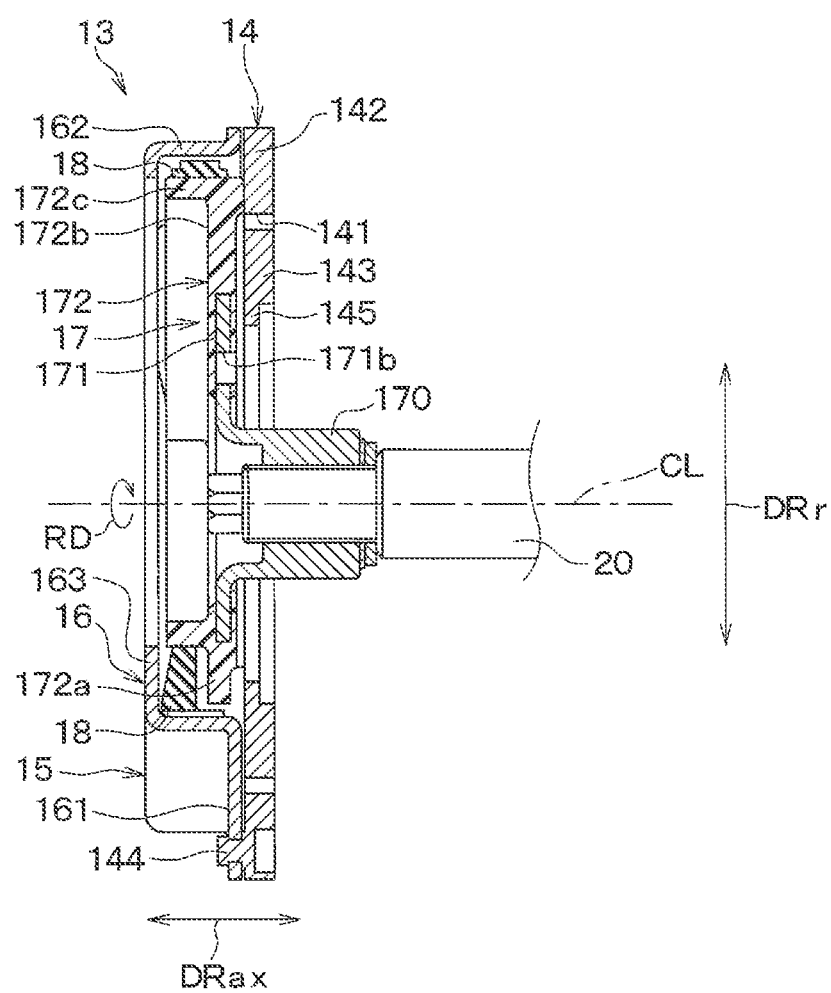
FIG. 10 is a cross-sectional view of a hub of a power transmission device of a second embodiment taken along the line V-V.

A power transmission device according to a second embodiment of the present disclosure will be described with reference to FIG. 10. In comparison to the power transmission device of the first embodiment, the power transmission device of the present embodiment further includes a projection 145 that projects from an inner peripheral surface of the inner peripheral portion 143 of the armature 14 toward the center of the inner peripheral portion 143. Due to the presence of the projection 145, a cross section of the inner peripheral surface of the inner peripheral portion 143 of the armature 14 is shaped in a stepped form.

Specifically, the projection 145 is formed in a half range of the inner peripheral portion 143, which is one-half of the entire extent of the inner peripheral portion 143 in the plate thickness direction of the inner peripheral portion 143 and is located on the inner plate 172 side in the plate thickness direction of the inner peripheral portion 143.

With this configuration, a surface area of the inner peripheral portion 143 of the armature 14, which is opposed to the inner plate 172, is increased, and thereby the radiant heat, which is generated at the armature 14, can be effectively transmitted to the inner plate 172.

Here, it should be noted that in a case where the projection 145 is formed through the entire extent of the inner peripheral portion 143 in the plate thickness direction of the inner peripheral portion 143, the surface area of the magnetic pole becomes excessive to cause a reduction in a density of the magnetic flux, and thereby the magnetic attractive force between the armature 14 and the rotor 11 is deteriorated. However, in the present embodiment, the projection 145 is formed in the half range of the inner peripheral portion 143, which is the one-half of the entire extent of the inner peripheral portion 143 in the plate thickness direction of the inner peripheral portion 143 and is located on the inner plate 172 side in the plate thickness direction of the inner peripheral portion 143, so that the reduction in the magnetic attractive force between the armature 14 and the rotor 11 is limited, and the radiant heat, which is generated at the armature 14, can be effectively transmitted to the inner plate 172.

Furthermore, even when the inner plate 172 deforms or melts, the inner peripheral portion 143 of the armature 14 can be engaged with the inner side plate-shaped portion 171 to limit movement of the armature 14 toward the distal end of the shaft 20, and thereby releasing and flying of the armature 14 can be further reliably limited.

Third Embodiment

Figure 11:
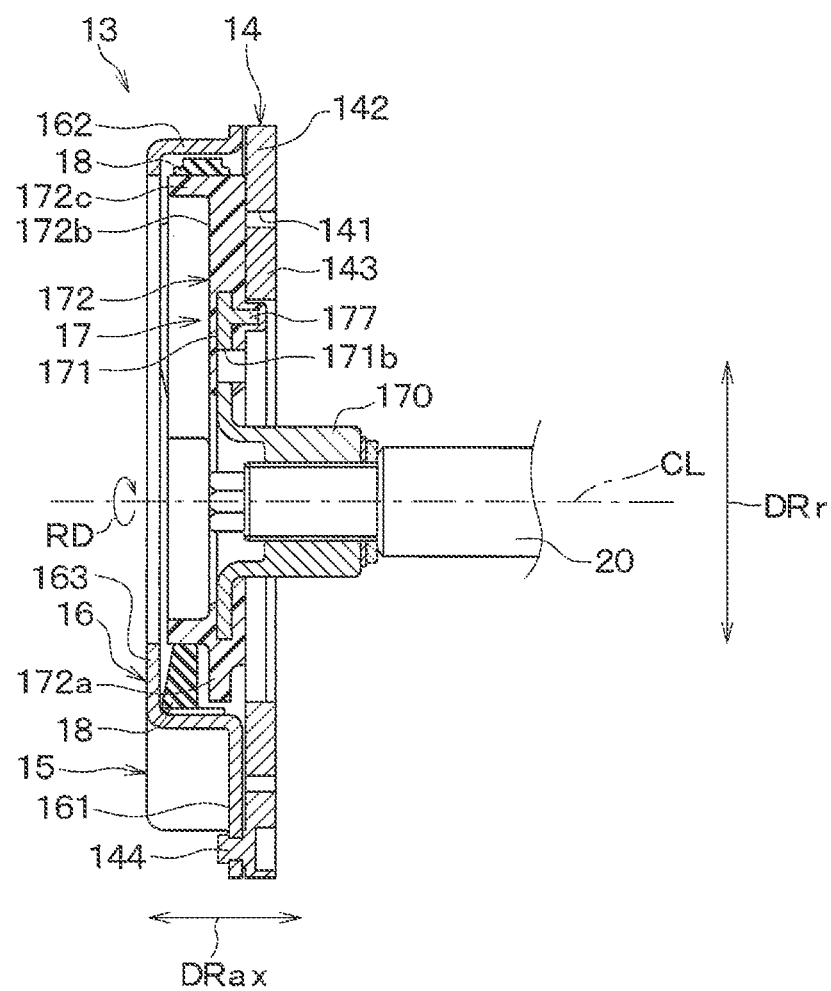
FIG. 11 is a cross-sectional view of a hub of a power transmission device of a third embodiment taken along the line V-V.

A power transmission device according to a third embodiment of the present disclosure will be described with reference to FIG. 11. In comparison to the power transmission device of the first embodiment, the power transmission device of the present embodiment further includes a projection 177 that is formed at the inner side plate-shaped portion 171 and projects to a location that is on the radially inner side of the inner peripheral portion 143 of the armature 14 in the axial direction of the shaft 20. The projection 177 is embedded in the inner plate 172. Therefore, the radiant heat, which is generated at the armature 14, can be effectively transmitted to the inner plate 172.

Fourth Embodiment

Figure 12:
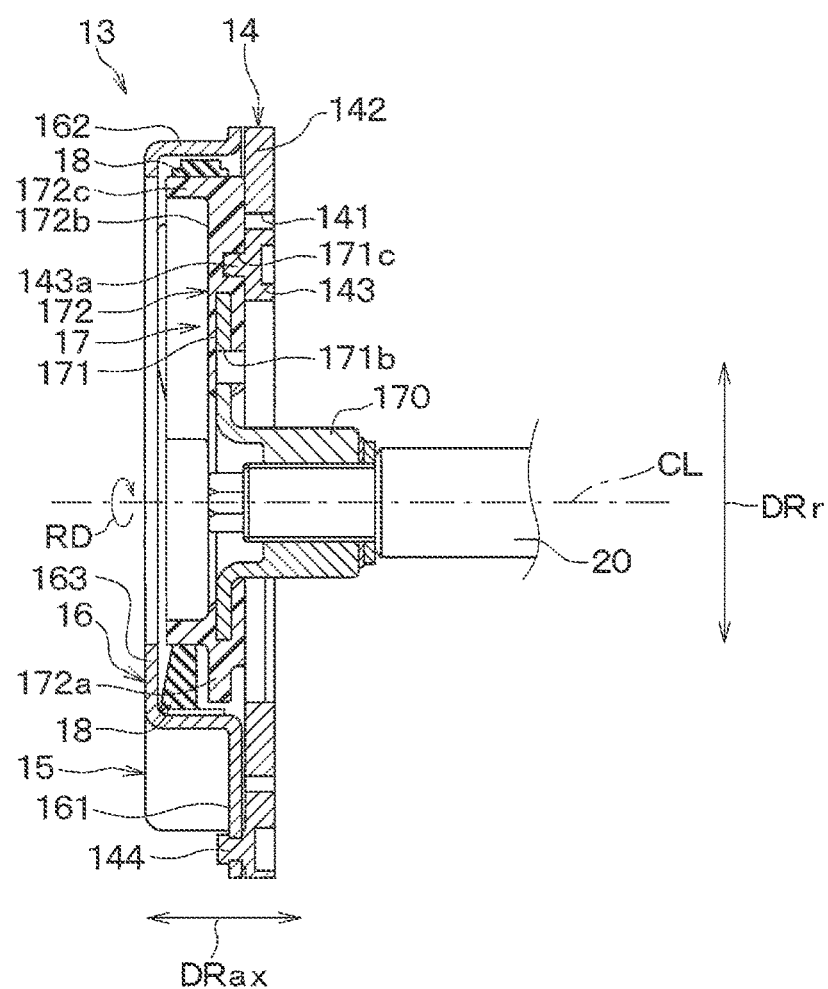
FIG. 12 is a cross-sectional view of a hub of a power transmission device of a fourth embodiment taken along the line V-V.

A power transmission device according to a fourth embodiment of the present disclosure will be described with reference to FIG. 12. The armature 14 of the present embodiment includes a projection 143a that projects toward the inner plate 172 and is inserted in a recess 171c formed at the inner plate 172.

Specifically, the inner peripheral portion 143 of the armature 14 includes the projection 143a that projects toward the inner plate 172. The inner plate 172 has the recess 171c that is formed at the location, which corresponds to the projection 143a. The projection 143a is inserted in the recess 171c of the inner plate 172, which is formed at the location that corresponds to the projection 143a. Therefore, the radiant heat, which is generated at the armature 14, can be effectively transmitted to the inner plate 172.

Fifth Embodiment

Figure 13:
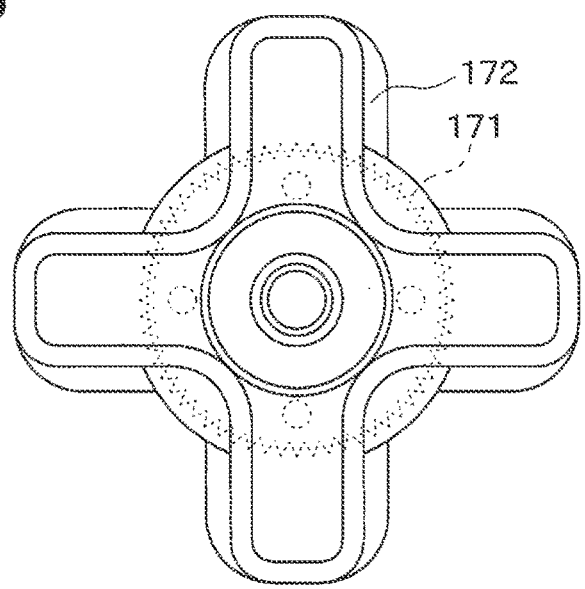
FIG. 13 is a front view of an inner hub of a power transmission device of a fifth embodiment.

A power transmission device according to a fifth embodiment of the present disclosure will be described with reference to FIG. 13. The inner side plate-shaped portion 171 of the first embodiment has the four projections 171a that outwardly project in the radial direction of the shaft 20. The inner side plate-shaped portion 171 of the present embodiment is shaped in a circular disk form and does not have the projections 171a unlike the inner side plate-shaped portion 171 of the first embodiment.

The inner side plate-shaped portion 171 of the present embodiment is shaped in the circular disk form and has bulges and depressions (surface geometric irregularities) at an outer peripheral surface of the inner side plate-shaped portion 171.

The inner side plate-shaped portion 171 of the present embodiment has the fine bulges and depressions at the outer peripheral surface of the inner side plate-shaped portion 171 to increase the bonding force between the inner side plate-shaped portion 171 and the inner plate 172. These bulges and depressions can be formed by knurling.

If the bulges and depressions are not formed at the outer peripheral surface of the inner side plate-shaped portion 171, the bonding force between the inner side plate-shaped portion 171 and the inner plate 172 becomes small. Thus, a large torque cannot be transmitted.

The inner plate 172, which is made of the resin, has a larger linear expansion coefficient in comparison to the inner side plate-shaped portion 171 formed by the metal member. Therefore, when the temperature of the inner plate 172 is increased upon the increase of the temperature of the friction surface of the armature 14 and the temperature of the friction surface of the end surface portion 113 of the rotor 11 by the frictional heat at the time of locking the compressor 2, the inner plate 172 expands such that the portion of the inner plate 172, which is located at the bulges and depressions, deforms away from the inner side plate-shaped portion 171. Thus, the bonding force between the inner side plate-shaped portion 171 and the inner plate 172 is rapidly decreased.

Therefore, the outer peripheral portion of the inner plate 172, i.e., the projecting portions 172b, the flange portion 172c and the receiving portions 172d of the inner plate 172 begin to rotate together with the armature 14 while the inner side plate-shaped portion 171 of the inner hub 17 is held stationary by the shaft 20 of the compressor 2.

Specifically, the transmission of the torque between the rotor 11 and the armature 14 is blocked, so that the breakage of the belt 7, which transmits the rotational drive force from the engine 6 to the rotor 11, can be limited.

Sixth Embodiment

A power transmission device according to a sixth embodiment of the present disclosure will be described. The outer hub 16 of the first embodiment is formed by the metal member that is made of, for example, aluminum. In contrast, the outer hub 16 of the present embodiment is made of resin having a melting point of about 180 to 300 degrees Celsius.

In each of the above embodiments, when the compressor 2 is locked, the temperature of the friction surface of the armature 14 and the temperature of the friction surface of the end surface portion 113 of the rotor 11 are increased by the frictional heat, and thereby the inner plate 172 deforms or melts.

In contrast, in the present embodiment, when the temperature of the friction surface of the armature 14 and the temperature of the friction surface of the end surface portion 113 of the rotor 11 are increased by the frictional heat, the outer hub 16, which is made of the resin having the melting point of about 180 to 300 degrees Celsius, also deforms or melts.

In this case, in the state where the temperature of the friction surface of the armature 14 and the temperature of the friction surface of the end surface portion 113 of the rotor 11 are increased by the frictional heat at the time of locking the compressor 2, the outer hub 16 deforms or melts even if the inner plate 172 does not deform or melt. Thus, the armature 14 begins to rotate together with the rotor 11 while the inner side plate-shaped portion 171 of the inner hub 17 and the rubber member 18 are fixed to the shaft 20 of the compressor 2.

As described above, the power transmission device of the present embodiment includes: the electromagnet 12 that is configured to generate the magnetic attractive force when the electromagnet 12 is energized; and the rotor 11 that is configured to rotate about the predetermined rotational axis CL when the rotor 11 receives the rotational drive force, which is outputted from the drive source 6, through the belt 7. The power transmission device of the present embodiment further includes: the armature 14 that is configured to be coupled to and is rotated together with the rotor 11 when the electromagnet 12 is energized, wherein the armature 14 is configured to be decoupled from the rotor 11 when the electromagnet 12 is deenergized; and the hub 15 that couples the armature 14 to the shaft 20 of the drive-subject device.

Furthermore, the hub 15 includes: the outer hub 16 that is coupled to the armature 14; the inner hub 17 that is coupled to the shaft 20; and the inner plate 172 that is placed between the outer hub 16 and the inner hub 17. The outer hub 16 is formed by the member that is configured to deform or melt with the heat generated by the friction between the rotor 11 and the armature 14 when the shaft 20 of the drive-subject device is locked at the time of energizing the electromagnet 12.

Therefore, the outer hub 16 deforms or melts with the heat generated by the friction between the rotor 11 and the armature 14 when the shaft 20 of the drive-subject device is locked at the time of energizing the electromagnet 12. Even in the locked state of the shaft 20, the armature 14 can be rotated together with the rotor 11, and thereby the breakage of the belt can be limited at the time of locking the compressor without using the thermal fuse.

In the present embodiment, although the inner plate 172 made of the resin is used, it is possible to use the inner plate 172 made of another material that is other than the resin.

Seventh Embodiment

A power transmission device according to a seventh embodiment of the present disclosure will be described. In the first embodiment, the fastening members 144, which couple between the outer peripheral portion 142 of the armature 14 and the hub 15, are formed by the metal members that are made of, for example, aluminum. In contrast, the fastening members 144 of the present embodiment are made of resin having a melting point of about 180 to 300 degrees Celsius. The outer hub 16 of the present embodiment is formed by the metal member that is made of, for example, aluminum.

In this case, in the state where the temperature of the friction surface of the armature 14 and the temperature of the friction surface of the end surface portion 113 of the rotor 11 are increased by the frictional heat at the time of locking the compressor 2, the fastening members 144 deform or melt even if the inner plate 172 does not deform or melt. Thus, the armature 14 begins to rotate while the inner side plate-shaped portion 171 of the inner hub 17, the rubber member 18 and the outer hub 16 are fixed to the shaft 20 of the compressor 2.

As discussed above, the power transmission device of the present embodiment is configured to transmit the rotational drive force, which is outputted from the drive source, to the drive-subject device 2, and the power transmission device of the present embodiment includes: the electromagnet 12 that is configured to generate the magnetic attractive force when the electromagnet 12 is energized; and the rotor 11 that is configured to rotate when the rotor 11 receives the rotational drive force, which is outputted from the drive source 6, through the belt 7. The power transmission device of the present embodiment further includes: the armature 14 that is configured to be coupled to and is rotated together with the rotor when the electromagnet is energized, wherein the armature 14 is configured to be decoupled from the rotor when the electromagnet is deenergized; and the hub 15 that couples the armature 14 to the shaft of the drive-subject device.

Furthermore, the hub 15 includes: the outer hub 16 that is coupled to the armature 14; the fastening members 144 that fasten the outer hub 16 to the armature 14; the inner hub 17 that is coupled to the shaft 20; and the inner plate 172 that is placed between the outer hub 16 and the inner hub 17. The fastening members 144 are respectively formed by the member that is configured to deform or melt with the heat generated by the friction between the rotor 11 and the armature 14 when the shaft 20 of the drive-subject device is locked at the time of energizing the electromagnet 12.

Therefore, the fastening members 144 deform or melt with the heat generated by the friction between the rotor 11 and the armature 14 when the shaft 20 of the drive-subject device is locked at the time of energizing the electromagnet 12. Even in the locked state of the shaft 20, the armature 14 can be rotated together with the rotor 11, and thereby the breakage of the belt can be limited at the time of locking the compressor without using the thermal fuse.

Other Embodiments (1) In each of the above embodiments, there is used the armature 14 that includes the two members, i.e., the outer peripheral portion 142, which is located on the radially outer side of the grooves 141; and the inner peripheral portion 143, which is located on the radially inner side of the grooves 141. The outer peripheral portion 142 and the inner peripheral portion 143 are concentrically arranged. Alternatively, there may be used an armature 14 that includes three or more members, which are concentrically arranged.

(2) In the first embodiment, the inner plate 172 is formed by the member that is configured to deform or melt with the heat generated by the friction between the rotor 11 and the armature 14 when the shaft 20 of the drive-subject device is locked at the time of energizing the electromagnet 12.

Alternatively, at least one of the inner side plate-shaped portion 171 and the inner plate 172 may be formed by a member that is configured to deform or melt with the heat that is generated by the friction between the rotor 11 and the armature 14 when the shaft 20 of the drive-subject device is locked at the time of energizing the electromagnet 12.

(3) In the second embodiment, the projection 145 is formed in the half range of the inner peripheral portion 143, which is one-half of the entire extent of the inner peripheral portion 143 in the plate thickness direction of the inner peripheral portion 143 and is located on the inner plate 172 side in the plate thickness direction of the inner peripheral portion 143. Thereby, the cross section of the inner peripheral surface of the inner peripheral portion 143 of the armature 14 is shaped in the stepped form. Alternatively, the projection 145 may be formed in another half range of the inner peripheral portion 143, which is one-half of the entire extent of the inner peripheral portion 143 in the plate thickness direction of the inner peripheral portion 143 and is located on the opposite side that is opposite to the inner plate 172 side in the plate thickness direction of the inner peripheral portion 143. Thereby, the cross section of the inner peripheral surface of the inner peripheral portion 143 of the armature 14 is shaped in the stepped form.

The present disclosure should not be limited to the above embodiments, and the above embodiments may be modified in various appropriate ways. The above embodiments are not necessarily unrelated to each other and can be combined in any appropriate combination unless such a combination is obviously impossible. The constituent component(s) of each of the above embodiments is/are not necessarily essential unless it is specifically stated that the constituent component(s) is/are essential in the above embodiment, or unless the component(s) is/are obviously essential in principle. In each of the embodiments described above, when a specific numerical value(s) such as a number, a numerical value, an amount or a range, of any of the constituent elements of the respective embodiments is mentioned, the present disclosure should not be limited to the specific numerical value(s) unless it is clearly stated that the specific numerical value(s) is essential, or the specific numerical value(s) is obviously essential in principle. In each of the embodiments described above, when a material, a shape, a positional relationship or the like of the respective constituent elements is mentioned, it should not be limited to the material, the shape, the positional relationship or the like of the respective constituent elements unless it is clearly stated that the material, the shape, the positional relationship or the like of the respective constituent element(s) is essential, or the material, the shape, the positional relationship or the like of the respective constituent element(s) is obviously essential in principle.

(Conclusion)

According to a first aspect, which is indicated by one or more or all of the embodiments described above, there is provided the power transmission device configured to transmit the rotational drive force, which is outputted from the drive source, to the drive-subject device, and the power transmission device includes the electromagnet that is configured to generate the magnetic attractive force when the electromagnet is energized. The power transmission device includes the rotor that is configured to rotate about the predetermined rotational axis when the rotor receives the rotational drive force, which is outputted from the drive source, through the belt. The power transmission device includes: the armature that is configured to be coupled to and is rotated together with the rotor when the electromagnet is energized, wherein the armature is configured to be decoupled from the rotor when the electromagnet is deenergized; and the hub that couples the armature to the shaft of the drive-subject device. The hub includes: the outer hub that is coupled to the armature; the boss portion that is coupled to the shaft; the inner side plate-shaped portion that extends from the boss portion toward the radially outer side in the radial direction of the shaft; and the inner plate that is placed between the outer hub and the inner side plate-shaped portion. The inner side plate-shaped portion and the inner plate are formed integrally in one piece. At least one of the inner side plate-shaped portion and the inner plate is formed by the member that is configured to deform or melt with the heat generated by friction between the rotor and the armature when the shaft of the drive-subject device is locked at the time of energizing the electromagnet.

Furthermore, according to a second aspect, the inner side plate-shaped portion is placed such that the center of the inner side plate-shaped portion coincides with the rotational axis of the rotor, and the armature includes the plurality of annular portions that are concentrically arranged about the rotational axis of the rotor. At least the radially innermost one of the plurality of annular portions has the circular opening at the center of the radially innermost one of the plurality of annular portions and is located between the rotor and the inner side plate-shaped portion, and the largest outer diameter of the inner side plate-shaped portion, which is largest in the circumferential direction of the inner side plate-shaped portion, is larger than the inner diameter of the circular opening of the radially innermost one of the plurality of annular portions.

Therefore, when the inner plate deforms or melts, the radially innermost one of the plurality of annular portions can be engaged with the inner side plate-shaped portion to limit releasing and flying of the armature. Furthermore, it is possible to limit the armature from flying and damaging the components of the vehicle.

Furthermore, according to a third aspect, the inner side plate-shaped portion includes the projection that outwardly projects in the radial direction of the shaft.

Since the inner side plate-shaped portion includes the projection, which outwardly projects in the radial direction of the shaft, the bonding force between the inner side plate-shaped portion and the inner plate can be increased.

Furthermore, in the case where the inner side plate-shaped portion includes the projection that outwardly projects in the radial direction of the shaft, the largest radius of the inner side plate-shaped portion, which is measured from the rotational axis of the rotor and is largest in the circumferential direction of the inner side plate-shaped portion, may be the radius measured from the rotational axis of the rotor to the outer peripheral surface of the projection.

Furthermore, according to a fourth aspect, the outer hub is fixed to at least a radially outermost one of the plurality of annular portions such that the outer hub covers an outer peripheral part of the inner side plate-shaped portion. Furthermore, the smallest inner diameter of the inner peripheral surface of the outer hub is larger than the largest outer diameter of the inner side plate-shaped portion, which is largest in the circumferential direction of the inner side plate-shaped portion.

Therefore, when the outer hub begins to rotate together with the armature upon the deforming or the melting of the inner plate, occurrence of contact of the outer hub to the inner side plate-shaped portion can be limited. Thus, the inner side plate-shaped portion does not interfere with the rotation of the outer hub.

According to a fifth aspect, the inner side plate-shaped portion is shaped in the circular disk form and has protrusions and recesses at the outer peripheral surface of the inner side plate-shaped portion. Therefore, in comparison to the inner side plate-shaped portion, which is shaped in the circular disk form but does not have the protrusions and recesses at the outer peripheral surface of the inner side plate-shaped portion, it is possible to increase the bonding force between the inner side plate-shaped portion and the inner plate. Thereby, a larger torque can be transmitted.

Furthermore, according to a sixth aspect, the recess is formed at the inner plate, and the armature has the projection that projects toward the inner plate in the axial direction of the shaft. Furthermore, the projection is inserted into the recess formed at the inner plate. Therefore, the heat transfer performance from the armature can be improved.

Furthermore, according to a seventh aspect, the cross section of the inner peripheral surface of the radially innermost one of the plurality of annular portions is shaped in the stepped form.

Therefore, the heat, which is generated at the armature, can be effectively transmitted to the inner plate while limiting the reduction of the magnetic attractive force between the armature and the rotor.

Furthermore, according to an eighth aspect, the inner side plate-shaped portion has the projection that projects in the axial direction of the shaft and is located on the radially inner side of the radially innermost one of the plurality of annular portions. Therefore, the heat transfer performance from the armature can be improved.

Furthermore, according to a ninth aspect, at least one of the inner side plate-shaped portion and the inner plate is made of the resin. As discussed above, at least one of the inner side plate-shaped portion and the inner plate can be made of the resin. Also, when at least one of the inner side plate-shaped portion and the inner plate is made of the resin, the weight can be reduced.

Furthermore, according to a tenth aspect, the inner plate is made of the resin, and the inner side plate-shaped portion is made of the metal. As discussed above, the inner plate can be made of the resin, and the inner side plate-shaped portion can be made of the metal. Also, by making the inner plate from the resin and making the inner side plate-shaped portion from the metal, the inner plate can deform or melt while the required strength of the inner side plate-shaped portion is ensured.

Furthermore, according to an eleventh aspect, there is provided the power transmission device configured to transmit the rotational drive force, which is outputted from the drive source, to the drive-subject device, and the power transmission device includes: the electromagnet that is configured to generate the magnetic attractive force when the electromagnet is energized; and the rotor that is configured to rotate when the rotor receives the rotational drive force, which is outputted from the drive source, through the belt. The power transmission device includes: the armature that is configured to be coupled to and is rotated together with the rotor when the electromagnet is energized, wherein the armature is configured to be decoupled from the rotor when the electromagnet is deenergized; and the hub that couples the armature to the shaft of the drive-subject device. Furthermore, the hub includes: the outer hub that is coupled to the armature; the inner hub that is coupled to the shaft; and the inner plate that is placed between the outer hub and the inner hub. The outer hub is formed by the member that is configured to deform or melt with the heat generated by the friction between the rotor and the armature when the shaft of the drive-subject device is locked at the time of energizing the electromagnet.

Furthermore, according to a twelfth aspect, there is provided the power transmission device configured to transmit the rotational drive force, which is outputted from the drive source, to the drive-subject device, and the power transmission device includes: the electromagnet that is configured to generate the magnetic attractive force when the electromagnet is energized; and the rotor that is configured to rotate when the rotor receives the rotational drive force, which is outputted from the drive source, through the belt. The power transmission device includes: the armature that is configured to be coupled to and is rotated together with the rotor when the electromagnet is energized, wherein the armature is configured to be decoupled from the rotor when the electromagnet is deenergized; and the hub that couples the armature to the shaft of the drive-subject device. The hub includes: the outer hub that is coupled to the armature; the fastening member that fastens the outer hub to the armature; the inner hub that is coupled to the shaft; and the inner plate that is placed between the outer hub and the inner hub. The fastening member is formed by the member that is configured to deform or melt with the heat generated by the friction between the rotor and the armature when the shaft of the drive-subject device is locked at the time of energizing the electromagnet.

What is claimed is:

1. A power transmission device configured to transmit a rotational drive force, which is outputted from a drive source, to a drive-subject device, comprising:
    an electromagnet that is configured to generate a magnetic attractive force when the electromagnet is energized;
    a rotor that is configured to rotate about a predetermined rotational axis when the rotor receives the rotational drive force, which is outputted from the drive source, through a belt;
    an armature that is configured to be coupled to and is rotated together with the rotor when the electromagnet is energized, wherein the armature is configured to be decoupled from the rotor when the electromagnet is deenergized; and
    a hub that couples the armature to a shaft of the drive-subject device, wherein:
    the hub includes:
        an outer hub that is coupled to the armature;
        a boss portion that is coupled to the shaft;
        an inner side plate-shaped portion that extends from the boss portion toward a radially outer side in a radial direction of the shaft; and
        an inner plate that is placed between the outer hub and the inner side plate-shaped portion;
    the inner side plate-shaped portion and the inner plate are secured together; and
    at least one of the inner side plate-shaped portion and the inner plate is formed by a member that is configured to deform or melt with heat generated by friction between the rotor and the armature when the shaft of the drive-subject device is locked at a time of energizing the electromagnet;
    the inner side plate-shaped portion is placed such that a center of the inner side plate-shaped portion coincides with the rotational axis of the rotor;
    the armature includes a plurality of annular portions that are concentrically arranged about the rotational axis of the rotor;
    at least a radially innermost one of the plurality of annular portions has a circular opening at a center of the radially innermost one of the plurality of annular portions and is located between the rotor and the inner side plate-shaped portion;
    a largest outer diameter of the inner side plate-shaped portion, which is largest in a circumferential direction of the inner side plate-shaped portion, is larger than an inner diameter of the circular opening of the radially innermost one of the plurality of annular portions; and
    two opposite axial sides of a radially outer end part of the inner side plate-shaped portion, which is located on a radially outer side of an inner peripheral surface of the circular opening, are both covered by the inner plate.

2. The power transmission device according to claim 1, wherein the inner side plate-shaped portion includes a projection that outwardly projects in the radial direction of the shaft.

3. The power transmission device according to claim 1, wherein:
    the outer hub is fixed to at least a radially outermost one of the plurality of annular portions such that the outer hub covers an outer peripheral part of the inner side plate-shaped portion; and a smallest inner diameter of an inner peripheral surface of the outer hub is larger than the largest outer diameter of the inner side plate-shaped portion, which is largest in the circumferential direction of the inner side plate-shaped portion.

4. The power transmission device according to claim 1, wherein the inner side plate-shaped portion is shaped in a circular disk form and has protrusions and recesses at an outer peripheral surface of the inner side plate-shaped portion.

5. The power transmission device according to claim 1, wherein:
   a recess is formed at the inner plate;
   the armature has a projection that projects toward the inner plate in an axial direction of the shaft; and
   the projection is inserted into the recess formed at the inner plate.

6. The power transmission device according to claim 1, wherein a cross section of an inner peripheral surface of the radially innermost one of the plurality of annular portions is shaped in a stepped form.

7. The power transmission device according to claim 1, wherein the inner side plate-shaped portion has a projection that projects in an axial direction of the shaft and is located on a radially inner side of the radially innermost one of the plurality of annular portions.

8. The power transmission device according to claim 1, wherein at least one of the inner side plate-shaped portion and the inner plate is made of resin.

9. The power transmission device according to claim 1, wherein the inner plate is made of resin, and the inner side plate-shaped portion is made of metal.

10. The power transmission device according to claim 1, wherein the inner plate is made of resin, and the outer hub is made of metal.

* * * * *